(12) United States Patent
Mahakul et al.

(10) Patent No.: US 7,311,086 B2
(45) Date of Patent: Dec. 25, 2007

(54) LOW EMISSION FUEL EFFICIENT DIESEL LOCOMOTIVE ENGINE INCLUDING A PISTON HAVING A TOROIDAL SURFACE

(75) Inventors: Budhadeb Mahakul, Naperville, IL (US); Kenneth M. Sinko, Oak Park, IL (US); Randal K. Albright, Montgomery, IL (US); Frank M. Graczyk, Darien, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 11/371,119

(22) Filed: Mar. 8, 2006

(65) Prior Publication Data

US 2006/0150955 A1   Jul. 13, 2006

Related U.S. Application Data

(62) Division of application No. 10/476,134, filed as application No. PCT/US02/13411 on Apr. 27, 2002, now Pat. No. 7,025,031.

(60) Provisional application No. 60/286,933, filed on Apr. 27, 2001.

(51) Int. Cl.
*F02M 37/04* (2006.01)

(52) U.S. Cl. .................... 123/500; 123/508
(58) Field of Classification Search ........ 123/500–502, 123/507, 508, 90.15–90.17
See application file for complete search history.

(56) References Cited

U.S. PATENT DOCUMENTS

| | | | | | |
|---|---|---|---|---|---|
| 4,432,327 | A | * | 2/1984 | Salzgeber | 123/502 |
| 4,594,988 | A | * | 6/1986 | Tompkins et al. | 123/502 |
| 5,287,840 | A | * | 2/1994 | Catanu et al. | 123/508 |
| 5,809,954 | A | * | 9/1998 | Devine et al. | 123/90.17 |
| 5,927,238 | A | * | 7/1999 | Watson | 123/90.15 |
| 5,960,755 | A | * | 10/1999 | Diggs et al. | 123/90.15 |
| 6,026,786 | A | * | 2/2000 | Groff et al. | 123/501 |

* cited by examiner

*Primary Examiner*—Marguerite McMahon
(74) *Attorney, Agent, or Firm*—Cook, Alex, McFarron, Manzo, Cummings & Mehler, Ltd.

(57) ABSTRACT

A diesel locomotive engine having a piston with a unique bowl geometry. The bowl is defined in part by a center portion having a partial spherical shape. A cone portion (22) is located adjacent the central portion. An annular toroidal surface (24) is connected to the cone portion (22) and is defined by a toroidal major diameter (Dtm) and a toroidal minor radius (Rtm). A crown rim (26) is connected to the annular toroidal surface (24) and to an upper flat rim face of a sidewall.

1 Claim, 2 Drawing Sheets

LOW EMISSION FUEL EFFICIENT DIESEL LOCOMOTIVE ENGINE INCLUDING A PISTON HAVING A TOROIDAL SURFACE

RELATED APPLICATION

This application is a divisional application of U.S. patent application Ser. No. 10/476,134 filed Oct. 25, 2003 now U.S. Pat. No. 7,025,031 and entitled "Low Emission Fuel Efficient Diesel Locomotive Engine Including a Piston Having a Toroidal Surface", which was the National Stage of International Application No. PCT/US02/13411, filed Apr. 27, 2002, which claims the benefit of U.S. Provisional Application No. 60/286,933, filed Apr. 27, 2001.

CROSS-REFERENCE TO RELATED APPLICATIONS

This application claims the benefit of U.S. Provisional Application No. 60/286,933 filed 27 Apr. 2001.

FIELD OF THE INVENTION

The present invention relates to combustion engines, and more particularly to a diesel locomotive engine having a piston with a bowl geometry.

BACKGROUND OF THE INVENTION

The use of a compression ratio piston with higher injection pressures is an acceptable method for achieving emission reduction in a diesel engine. However, raising the compression ratio also creates smoke of particulate matter. Furthermore, Increasing the injection pressures results in reduction of particulate with an increase in $NO_x$ emissions.

SUMMARY OF THE INVENTION

The present invention includes a diesel locomotive engine Including a piston having a unique bowl geometry. A piston according to the present invention includes an upper face having a center portion that is partially spherical in shape. A cone portion is adjacent to the center portion. An annular toroidal surface is formed adjacent to the cone portion and is defined by a toroidal major diameter and a toroidal minor radius. A crown rim is adjacent the annular toroidal surface. The geometry of the piston bowl provides increased compression ratio and at the same time low emissions and high fuel efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
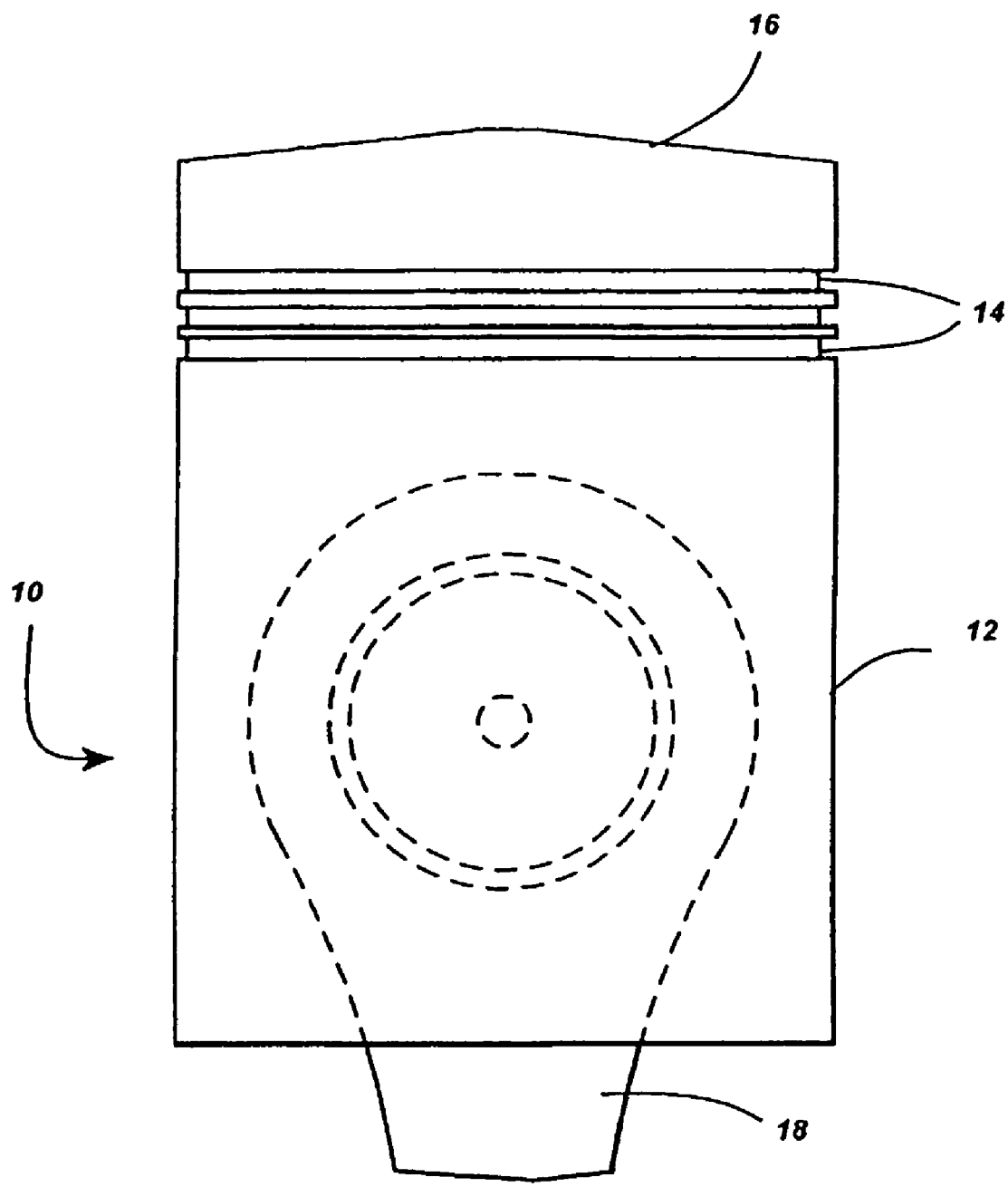
FIG. 1 is an elevational view generally showing the piston of the present invention.

The following description of the preferred embodiment(s) is merely exemplary in nature and is in no way intended to limit the invention, its application, or uses. FIG. 1 shows a piston generally indicated at 10. The piston 10 may be used in an internal combustion engine, such as a locomotive engine. As is known In the art, the engine may have a plurality of cylinders each for receiving a piston 10. The cylinders may be configured in a traditional V-12 design, or any other design.

The piston 10 includes a generally annular sidewall 12 having a plurality of grooves 14 thereon. The grooves are for receiving a plurality of rings to seal the piston 10 against the sidewall of the cylinder, as is well known in the art. The piston 10 also includes a top wall 16 at the top of annular sidewall 12. A connecting rod 18 may also be pivotally secured to the piston 10 in a conventional manner.

Figure 2:
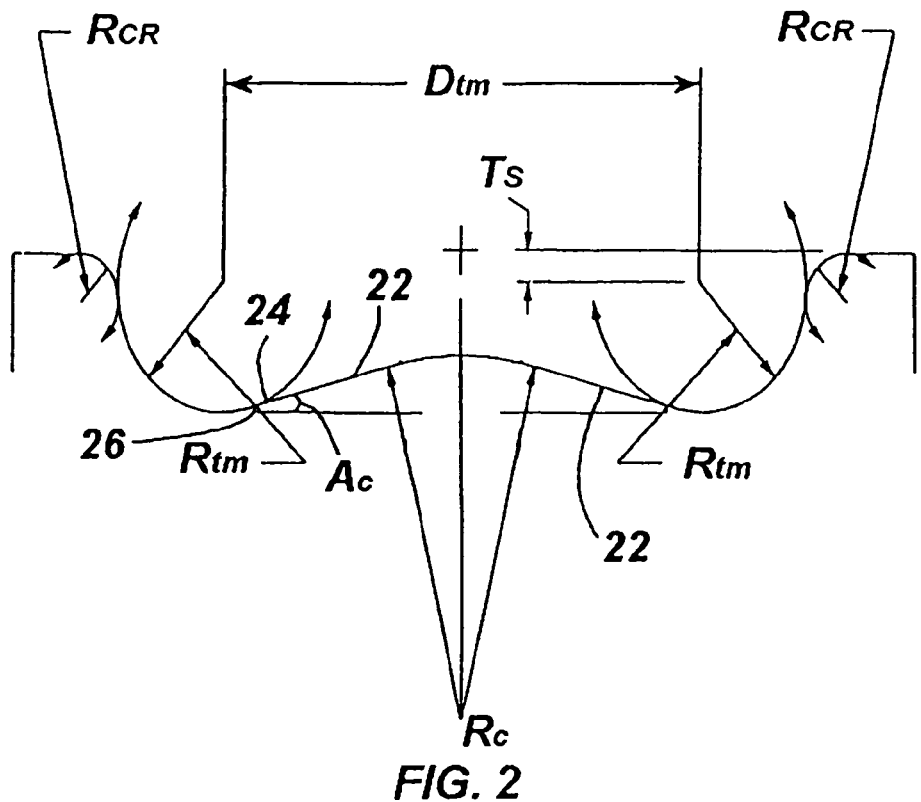
FIG. 2 illustrates a piston having a bowl geometry including a toroidal surface according to one presently preferred embodiment of the present invention.

As shown in FIG. 2, the top wall 16 of the piston includes a center portion 20 having a partially spherical shape. Preferably, the center portion has a spherical radius $R_c$ of about three inches. A cone portion 22 is connected to the center portion 20 and preferably is formed at an angle $A_c$ of about 14 degrees. An annular toroidal surface 24 is formed adjacent to the cone portion 22 and is defined in part by a toroidal major diameter $D_{tm}$ of about 0.822 inches and a toroidal minor radius $R_{tm}$ of about 0.77 inches. A crown rim 26 is formed adjacent to the annular toroidal surface 24 and is connected to an upper flat rim face of sidewall 12. The crown rim 26 preferably has a radius $R_{CR}$ of about 0.38 inches.

The annular toroidal surface 24 is preferably formed wherein the toroidal minor radius is measured from a point that is submerged approximately 0.496 inches below the upper flat rim face. This is also known as the toroidal submersion below squish land and is denoted as $T_s$ in FIG. 2. Preferably a piston 10 having a bowl configuration as described above would have a bowl volume of approximately 35.185 cubic inches.

Figure 3:
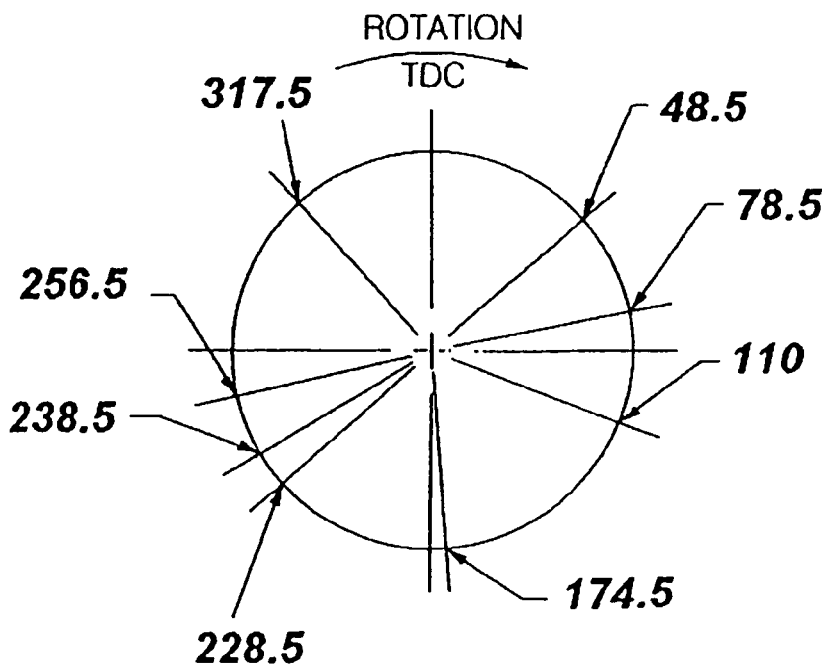
FIG. 3 is a camshaft timing diagram illustrating the timing sequence of one presently preferred embodiment of the present invention.

One unique feature of the above-stated dimensions provides the ability to retard injection timing of the engine to lower emission while meeting smoke criterion and optimizing fuel economy. In the fuel injection camshaft lobe, changes were made to the lobe to ensure that optimum injection pressure was realized. By phasing the camshaft to the correct position, an optimum location favorable from emission and fuel economy standpoint was discovered. Additional changes to the exhaust cam lobe were made to improve lower $NO_x$ emission. From the tests it was found that phasing the camshaft as schematically illustrated in FIG. 3 provided benefits in reducing $NO_x$ emissions. FIG. 3 provides a schematic representation of camshaft timing angles according to one embodiment of the present invention. The angular representation of FIG. 3 as described below is base on degrees of rotation from top dead center.

The centerline of the injector cam is at 48.5 degrees. The start of the exhaust profile is at 78.5 degrees. The valve open 0.026-inch lift occurs at 110 degrees. The max valve lift occurs at 174.5 degrees. The injection profile ends at 228.5 degrees. The valve close 0.026-inch lift occurs at 238.5 degrees. The end of the exhaust profile occurs at 256.5 degrees. The start of the injection profile occurs at 317.5 degrees.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of phasing a camshaft for improving lower $NO_x$ emission and for improving fuel economy of a two-cycle diesel engine having a piston, comprising:

providing a camshaft for actuating a fuel injection cam and an exhaust cam for actuating an exhaust valve; the fuel injection cam having a lobe and a centerline, said fuel injection cam having a particular injection profile, said fuel injection cam being situated on said camshaft and in relation to top dead center of the piston; the exhaust cam having a lobe and a centerline, said exhaust cam having a particular injection profile, said exhaust cam being situated on said camshaft and in relation to top dead center of the piston;

providing the center line of the fuel injection cam at about 48.5 degrees past top such that the peak lift of the injector cam occurs at about 48.5 degrees past top dead center after dead center beginning to open;

the exhaust valve at about 78.5 degrees past top dead center;

opening an exhaust valve to about 0.026 inches lift at about 110 degrees past top dead center;

maximizing lift of the exhaust valve at about 174.5 degrees past top dead center;

stopping the actuation of the fuel injector profile at about 228.5 degrees past top dead center;

reducing the lift of the exhaust valve to about 0.026 inches at about 238.5 degrees past top dead center;

closing the exhaust valve at about 256.5 degrees past top dead center; and beginning the actuation of the fuel injector about 317.5 degrees past top dead center.

\* \* \* \* \*